United States Patent Office 3,516,102
Patented June 23, 1970

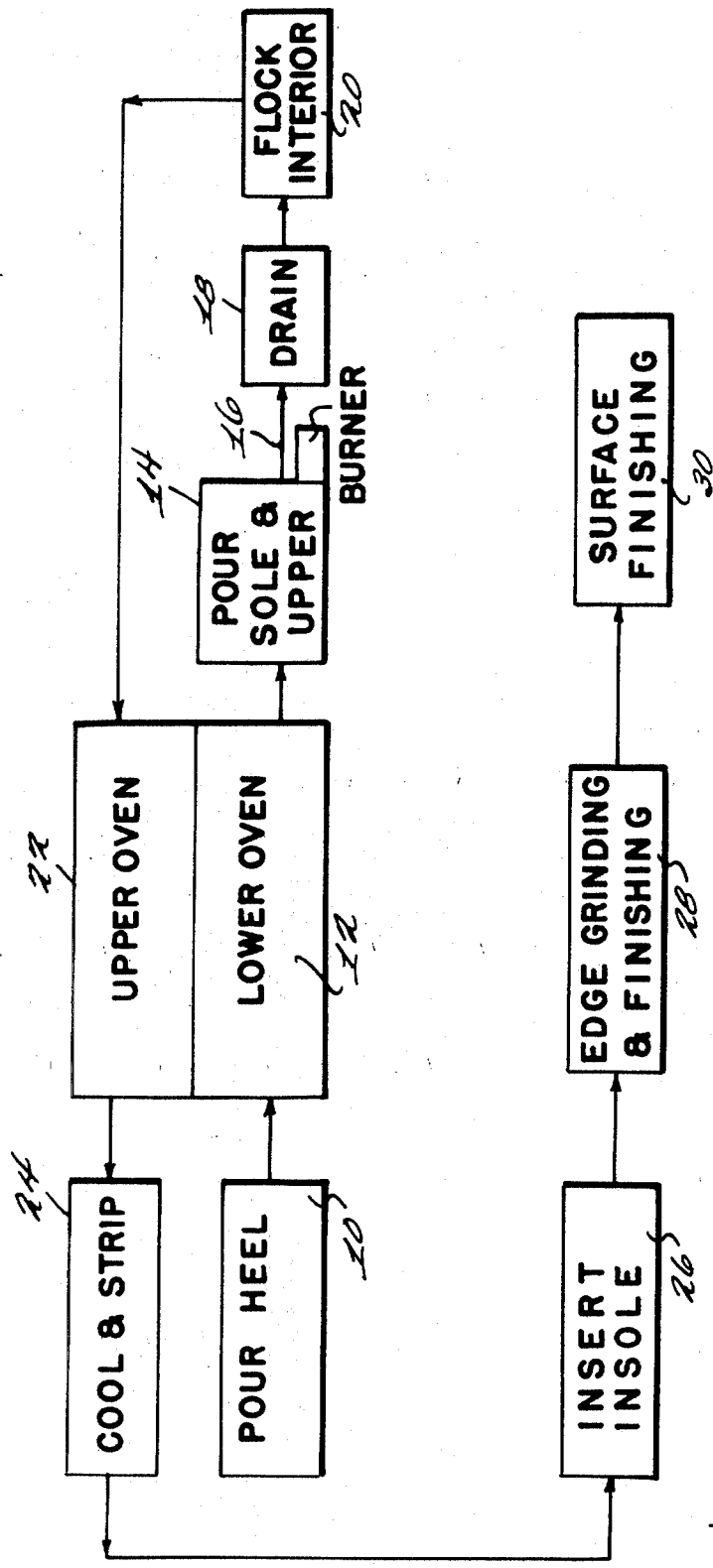

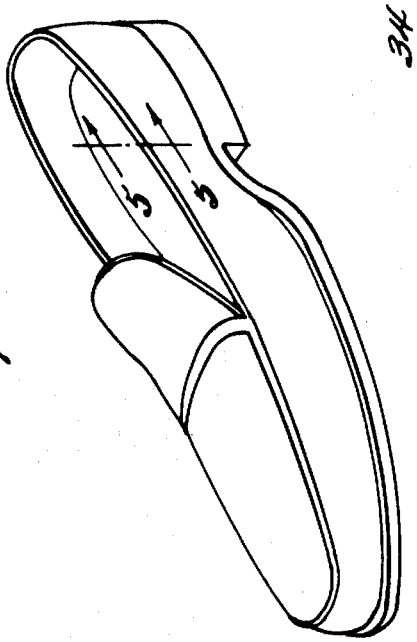
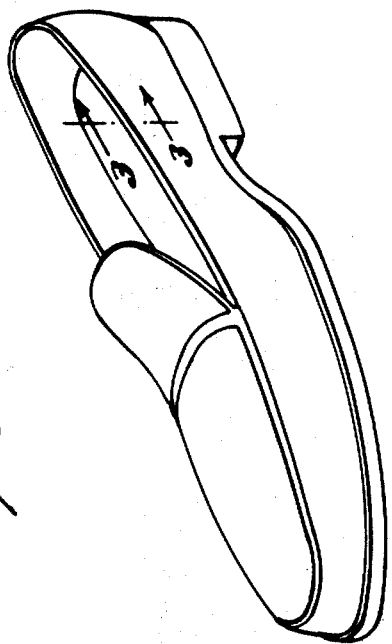

3,516,102
METHOD OF MAKING STREET SHOES
Terry Allen Moshier, Atlanta, Ga., assignor, by mesne assignments, to Imagineering Industries, Inc., St. Louis, Mo., a corporation of Missouri
Filed June 15, 1967, Ser. No. 646,307
Int. Cl. B29d 3/00; A43d 65/00
U.S. Cl. 12—142          5 Claims

ABSTRACT OF THE DISCLOSURE

A method for making slush molded plastic type street shoes which includes pouring plastisol into the sole and heel cavities of a suitable mold, heating the mold, pouring plastisol into the mold in quantities sufficient to form the upper portion of the shoe, dumping excess plastisol from the mold, flocking the interior surface of the resinous shoe in the mold, heating the mold to fuse the resinous material in the mold, stripping the shoe from the mold and finishing the collar of the shoe by and solvent treatment to impart a roller-over or bulbous configuration thereto.

Additionally the outer surface of the shoe can be sprayed with a pigment composition to achieve a cordovan or antique finish.

---

This invention relates to a method for making slush molded plastic footwear and more particularly to slush molded plastic street shoes.

Slush molding processes have been employed in the past to produce rubber-like footwear. Representative processes are disclosed, for instance, in U.S. Pat. 2,588,-571; 2,880,467; 2,939,180; 2,974,373; 3,035,309 and 3,-288,819. Basic to these processes and to the instant invention is filling a hollow mold with plastisol, allowing the material on the mold walls to gel, removing excess plastisol from the mold, curing the remainder of the plastisol in the mold and stripping the product from the mold. Heretofore, however, slush molding processes for making footwear have been directed principally to the production of rain footwear including boots, galoshes, gaiters and the like. Certain variations of the basic process have been provided to attain a more commercially acceptable product. These variations generally have included novel methods of reinforcing designated portions of the rubber-like footwear, providing an expanded cellular lining for the rain-proof boots or footwear, providing insulation to selected areas of the footwear and other similar modifications.

Opposed to the processes disclosed in the above-mentioned patents as well as others also dealing with the production of rain footwear is the process of the present invention which is directed to the production of street shoes by slush molding technique. While, indeed certain of the basic procedures common to slush molding operations are also attendant in the instant invention, certain improvements and novel operations, not heretofore known, are used in combination with the basic operations to provide novel footwear which is economical to produce and which can compete successfully with street shoes of a similar type but which are built up, conventionally, on shoe lasts.

It is therefore a primary object of this invention to provide a method of making a slush molded step-in type street shoe. More specifically, this invention contemplates a step-in type street shoe formed by a slush molding technique wherein the sole area of the shoe comprising a broad flat heel portion and sole portion has a predetermined thickness, preferably greater than the thickness of the shoe upper, and wherein the collar or the peripheral edge of the aperture provided to receive and engage the wearer's foot is treated to simulate the corresponding portion of a shoe made in accordance with conventional procedures. In another embodiment of the instant invention the outer surface of the shoe is treated to resemble a cordovan or "antique" finish thereby providing a leather-like, highly commercially attractive product.

Other and further objects and advantages of the invention will be pointed out in the following more detailed description and by reference to the accompanying drawings wherein:

FIG. 1 is a schematic illustration of the sequence of operations employed to produce the novel step-in type shoe of this invention;

FIG. 2 is a perspective view of a step-in type shoe made in accordance with the instant invention prior to treating the collar or peripheral edge of the aperture provided to receive the wearer's foot;

FIG. 3 is a partial sectional view taken along the line 3—3 of FIG. 2;

FIG. 4 is a perspective view of the shoe shown in FIG. 3 subsequent to treating the said collar or peripheral edge; and FIG. 5 is a partial sectional view taken along the line 5—5 of FIG. 4.

In carrying out the method of this invention and referring to FIG. 1 there is provided a metal mold of the customary type used in slush molding whose interior is contoured and textured to correspond to the outer surface of the desired step-in shoe (but in reverse). In the use of this mold, in the practice of the present invention, a predetermined amount of a fluid plastic of the selected type in creamy liquid condition is introduced therein at the heel pouring station 10. The amount generally will be sufficient to fill the heel cavity of the mold preferably to a depth somewhat greater than necessary to only fill this cavity but less than the depth necessary to form the upper portion of the shoe. The mold is then heated to a temperature of about 180°–280° F. for a period of time ranging between 6–8 minutes by passing the same through an oven 12. Obviously, the time and temperature conditions during this heating process will vary depending on the choice of creamy resinous composition, the thickness of the heel cavity as well as other factors easily determined by those skilled in the art.

On emergence from this heating treatment in the oven 12, additional liquid heat-fusible composition is introduced into the hot mold to a height at least sufficient to produce the finished article at the shoe sole and upper pouring station 14. The heat of the mold assists in causing a layer of plastic material contacting the mold walls to be deposited thereon and adhered thereto. After insertion of this additional creamy plastic material into the mold, the mold may be subjected to localized heating at the sole area thereof to enhance the gelling and initiating the fusing or curing of the resinous material present in the heel and sole cavities by passing the mold over a burner 16, if desired. This localized heating also assists in gelling the layer of resinous material forming the upper portion of the shoe and when the desired thickness of the deposit layer constituting this upper portion of the shoe has been achieved, the remainder of the creamy plastic material is drained or poured from the mold at the draining station 18.

At this stage of the operation, the innermost surface of the embryonic shoe has a surface characteristic which is gummy or tacky. While this surface characteristic exists the innermost surface is sprayed by mean of any conventional spray device with a desired coating material such as comminuted cotton or rayon to provide a layer generally about 7 to 20 mils thick. This flock coating provides a moisture absorbing layer for the interior of the finished shoe.

Thereafter, the mold is subjected to further heat treatment to fuse the resin deposited on the inner walls of the mold by passing the mold through the oven 22 which is maintained at a temperature of about 350°–500° F. The residence time of the mold in the oven at this temperature range will be sufficient to fuse the resin to a tough leather-like homogeneous material, the thickness of which will be generally about 50 to 120 mils. Times ranging from about 20 seconds to 5 or 6 minutes can be employed and will depend on a number of factors easily determined by those skilled in the art, including the thickness of the upper and sole areas of the desired product as well as the particular composition of the initially creamy plastic material chosen.

At the completion of this fusion operation the relatively thin upper portion of the shoe is fused into an integral product with the relatively thick heel and sole portion thereof. The mold is then cooled by any convenient means as by contacting the outer surface of the mold with a cooling medium such as water by dipping or spraying the same with the cooling medium at the cooling and stripping station 24. Cooling air or other cooling media can also be used if desired. The step-in type shoe is then stripped from the mold.

An inner sole of predetermined size and thickness corresponding to the interior bottom surface of the shoe stripped from the mold is inserted therein and fixedly attached thereto by any convenient means such as an adhesive material at station 26. The inner sole provides the desired degree of stiffness to the finished shoe product and can be made, for instance, of any suitable material with the desired degree of flexibility such as composition board.

Also in the finishing operations, the collar or peripheral edge of the aperture provided for receiving and engaging the wearer's foot is subjected to a grinding operation to smooth the outer surface of the edge thereby removing any sharp or uneven edges existing after surplus material or flashing has been removed from the embryonic shoe when stripped from the mold at the edge grinding and finishing station 28. Generally, the flashing is removed by cutting or any other convenient means. The configuration of the collar or peripheral edge at this stage is more clearly shown at 32 in FIG. 3.

After grinding the collar or peripheral edge by means of a conventional grinding device, the smoothed edge is solvent treated to impart a generally rounded collar thereby simulating the usual rolled-over configuration associated with conventionally-made step-in type shoes which is ordinarily achieved by a layer of folded over leather. The configuration of the collar or peripheral edge at this stage is more clearly shown at 34 in FIG. 5. The application of a suitable solvent to the collar is continued for a time sufficient to dissolve excess plastic material and to cause a swelling of the plastic material at this point to a degree sufficient to impart this rounded or rolled over configuration. The dissolved material can be wiped off with a cloth or any other absorbent material. Obviously the time of the treatment will depend on a number of easily ascertainable factors, such as the composition of the plastic material, the thickness of the upper portion of the shoe at this point as well as the particular solvent chosen. It has been found convenient to continue the peripheral edge solvent treatment for a time ranging between 0.4 to 3 minutes, preferably about 0.75–1 minute.

As another embodiment of the present invention, the outer surface of step-in type shoes can be treated to impart to the same a cordovan or antique finish by applying, for instance by spraying the same with a pigment-containing coating composition at surface finishing station 30. Generally, the coating composition is applied to preselected areas of the outer surface such as simulated stitch lines, to simulate a natural, two-tone three dimensional leather-like effect.

In the practice of this invention, the plastic material used to produce the slush molded step-in type shoe is preferably a vinyl plastisol, prepared by dispersing finely divided polyvinyl resin powder in a liquid plasticizer therefor to form a creamy liquid. Generally, the vinyl plastisol is a dispersion in a plasticizer of a vinyl resin which can be a polymer of vinyl chloride or a copolymer in which vinyl chloride is the predominant constituent. Plastisol grade polyvinyl resin is commercially available under such trade names as Geon 121, 155, 202 and 201, manufactured by B. F. Goodrich, QYNV and QYLF-2 manufactured by Union Carbide Corp., and VC-260-S, manufactured by Borden Chemical Co. The vinyl resin generally will be present in the plastisol composition in amounts ranging from about 40–80 percent, preferably about 50–70 percent by weight of the total composition.

Representative plasticizers suitable for use with the vinyl resin to form a plastisol employed in this invention include both monomeric and resinous type plasticizers. Typical monomeric type plasticizers include such compounds as the phthalate esters, for instance, di-2-ethyl hexyl, butyl benzyl, butyl cyclohexyl, dibutyl, dicapryl, didecyl, butyl actyl, butyl decyl, hexano isobutyrate; isophthalates such as butyl (oxo) decyl and butyl-2-ethyl hexyl; phosphates such as diphenyl-2-ethyl hexyl, tricresyl, "Flexol" TOF; adipates such as didecyl, diisobutyl, diisoctyl, octyl decyl; azelates such as d-2-ethyl butyl, di-2-ethyl hexyl, diisooctyl; benzoates such as "Flexol" 77-G; citrates such as acetyl tributyl acetyl triethyl; octoates such as "Flexol" 8N8, "Flexol" 4G0; sebacates such as dibutyl, dioctyl; ricinoleates such as polybutyl acetyl, methyl acetyl, isobutyl acetyl as well as others sold under the trade names as Paraplex G-25, G-60, G-62, Plastolein-9720, -9250, Staflex KA. Generally the plasticizer will be present in amounts between 15–45 percent, preferably between 20–40 percent of the total plastisol composition.

Other modifiers and additives can also be incorporated into the plastisol composition such as stabilizers, lubricants and pigments. Suitable stabilizers present in amounts of about 2–10 percent by weight of the total plastisol composition can include Simpron 966, manufactured by Synthetics Product Co., inorganic oxides, salts of inorganic bases with weak acids, complex organo-metallic compounds and various glycidyl compounds, and various epoxy compounds such as epoxidized soybean oil sold under the trade name EP-8 by Union Carbide. Black or red-brown pigments in amounts of about 1–2 percent by weight of the plastisol composition are generally included in the plastisol formulation. Additionally, additives suitable for lowering the viscosity of the formulation while raising the gel temperature can also be employed. Representative of such additives is a high boiling medium petroleum distillate sold under the trade name Shellflex 212 which can be present in the plastisol composition in amounts ranging from 0–8 percent based on the total weight. Release compounds can also be included in the plastisol composition such as polyethylene glycol monolaurate in amounts up to about 2 percent by weight of the total composition.

A satisfactory formulation for the sole area of the step-in type shoe of this invention, including the heel portion and the sole portion is a plastisol comprising the following ingredients and having a viscosity between 2,000 and 4,000 cp. at 75° F.

| | Parts by weight |
|---|---|
| "Plastisol grade" polyvinyl chloride: | |
| QYLF-2 | 50 |
| Geon 121 | 50 |
| Plasticizer: | |
| Butyloctyl phthalate | 30 |
| Butyl benzyl phthalate (Santicizer 160) | 20 |
| Dicapryl phthalate | 15 |
| Hexanol isobutyrate | 10 |
| Stabilizer: | |
| Epoxidized soybean oil (EP-8) | 3 |
| Simpron 966 | 2 |
| Pigment—black | 1 |

Preferably the heel formed will have a thickness ranging from ⅜ to ¾ inch and the sole will have a thickness ranging from 60 to 130 mils.

A satisfactory formulation for the upper portion of the step-in type shoe of this invention is a plastisol comprising the following ingredients and having a viscosity between 2,000 and 4,000 cp. at 75° F.

| | Parts by weight |
|---|---|
| "Plastisol grade" polyvinyl chloride: | |
| QYLF-2 | 65 |
| VC-260-S | 35 |
| Plasticizer: | |
| Dicapryl phthalate | 35 |
| Butyl phenyl phthalate (Santicizer 160) | 7 |
| Stabilizer: | |
| Epoxidized soybean oil (EP-8) | 5 |
| Simpron 966 | 3 |
| Viscosity adjuster: | |
| High boiling medium petroleum distillate (Shellflex 212) | 5 |
| Coloring pigment | 2 |
| Release compound: | |
| Polyethylene glycol monolaurate | 1 |

Preferably the upper portion of the shoe will have a thickness ranging from 50 to 130 mils.

A highly effective surface finishing composition employed to achieve a natural cordovan leather-like finish on the step-in type shoe comprises the following ingredients:

| | Parts by weight |
|---|---|
| Acraloid—a medium molecular weight acrylic resin sold by Rhom & Haas | 10 |
| VYNW—a vinyl solution resin | 7 |
| Methylethyl ketone | 83 |

To achieve a rolled-over or rounded edge of the collar or peripheral edge of the aperture provided to receive and engage the wearer's foot, this collar portion is contacted with an edge finishing compound selected from the group consisting of methylethyl ketone and tetrahydro furan. The edge finishing compound preferably is applied under moderate pressure as by rubbing the same on the collar portion of the shoe. Application of the edge finishing compound is continued for a time sufficient to cause the collar to lose its sharp corners and to assume a slightly bulbous or rolled-over configuration. Generally, the application time will vary between about .4–3 minutes or longer depending, obviously, on the composition chosen for the plastisol employed in forming the upper portion of the step-in type shoe.

It has been found that a step-in type shoe treated in accordance with the instant invention and especially one having the collar or peripheral edge portion of the foot receiving aperture treated with an edge finishing compound as disclosed herein, provides a highly commercially attractive product substantially undetectable from a step-in type shoe produced from leather in accordance with less economical and conventional methods employing shoe lasts. The rolling-over of the collar or peripheral edge imparts "leather authenticity" to the appearance of the shoe especially when the outer surface thereof has been treated to achieve a cordovan leather or antique finish. A step-in type shoe made in accordance with the instant invention has been found to have five times the abrasive resistance of ordinary leather.

What is claimed is:

1. A method of making a shoe suitable for street wear comprising filling a hollow mold having a cavity corresponding in contour to the shape of the outer surface of said shoe with a liquid heat-fusible composition to a level which corresponds substantially to the height of the heel portion of the shoe to be formed therein, heating said mold to a temperature above the gel point of said composition thereby forming a relatively thick layer in the heel portion, pouring additional liquid heat-fusible composition into the mold to a level which corresponds at least to the height of said shoe to be formed therein and including the sole portion thereon, said heated mold providing the latent heat for gelling the material adjacent the walls of said mold to form the sole, sidewalls and upper portion of said shoe, removing from said mold said liquid heat-fusible composition in excess of that amount required to form said coating of said liquid heat-fusible composition on the interior side wall faces of said mold, applying a flocking composition to the free surface of the coating to provide a moisture absorbing layer at the interior of the shoe, heating said mold to a temperature to fuse and cure the heat-fusible composition, removing said shoe from said mold, finishing the collar of the shoe and applying a solvent to the finished collar for a time sufficient to dissolve excess heat-fusible composition and to impart a bulbous configuration to said collar.

2. The method of claim 1 which includes securing an inner sole to the shoe removed from the mold.

3. The method of claim 1 which includes applying a pigment-containing coating composition to the outer surface of the shoe removed from the mold to provide an antique finish.

4. The method of claim 1 wherein the heat-fusible composition is a vinyl plastisol.

5. The method of claim 1 wherein the solvent applied to the finished collar of the shoe is selected from the group consisting of methylethyl ketone and tetrahydro furan.

References Cited

UNITED STATES PATENTS 3,198,864   8/1965   Bingham _____ 264—302

FOREIGN PATENTS 1,206,522   8/1959   France.
548,707   11/1957   Canada.

OTHER REFERENCES

"The Decorating and Marking of Plastic Products," Department of Plastics Technology, Arthur N. Skeels, March 1953, pp. 803–805.

ROBERT F. WHITE, Primary Examiner

R. H. SHEAR, Assistant Examiner

U.S. Cl. X.R.

264—129, 244, 255